(12) United States Patent
Ying et al.

(10) Patent No.: US 9,712,575 B2
(45) Date of Patent: Jul. 18, 2017

(54) INTERACTIONS FOR VIEWING CONTENT IN A DIGITAL MAGAZINE

(71) Applicant: Flipboard, Inc., Palo Alto, CA (US)

(72) Inventors: Charles H. Ying, San Mateo, CA (US); Marcos A. Weskamp, Palo Alto, CA (US); Evan R. Doll, Menlo Park, CA (US); Didier Hilhorst, San Francisco, CA (US); Michael Johnston, Mountain View, CA (US)

(73) Assignee: Flipboard, Inc., Palo Alto, CA (US)

( * ) Notice: Subject to any disclaimer, the term of this patent is extended or adjusted under 35 U.S.C. 154(b) by 27 days.

(21) Appl. No.: 14/024,510

(22) Filed: Sep. 11, 2013

(65) Prior Publication Data

US 2014/0074624 A1    Mar. 13, 2014

Related U.S. Application Data

(60) Provisional application No. 61/700,307, filed on Sep. 12, 2012, provisional application No. 61/752,951, (Continued)

(51) Int. Cl.
*G06F 17/00* (2006.01)
*H04L 29/06* (2006.01)
(Continued)

(52) U.S. Cl.
CPC ............ *H04L 65/403* (2013.01); *G06F 3/013* (2013.01); *G06F 3/0482* (2013.01); (Continued)

(58) Field of Classification Search
CPC .............................. G06F 17/211; G06F 17/212
See application file for complete search history.

(56) References Cited

U.S. PATENT DOCUMENTS

| 6,266,059 B1* | 7/2001 | Matthews, III | ....... G06F 9/4443 715/716 |
| 7,224,892 B2* | 5/2007 | Yashiro | ................ G11B 27/034 386/230 |

(Continued)

FOREIGN PATENT DOCUMENTS

| CN | 101127784 A | 2/2008 |
| CN | 101297315 A | 10/2008 |
| WO | WO 2010/132491 A2 | 11/2010 |

OTHER PUBLICATIONS

PCT International Search Report and Written Opinion for PCT/US2013/059302, Jan. 28, 2014, 11 Pages.
(Continued)

*Primary Examiner* — Laurie Ries
(74) *Attorney, Agent, or Firm* — Fenwick & West LLP

(57) ABSTRACT

A digital magazine server user interacts with a client device presenting one or more content items from the digital magazine server to access various content items identified by the digital magazine server. For example, the user interacts with a portion of a display device of the client device and traverses to an additional portion of the display device to view additional content items on the display device. Based on a rate at which the user traverses from the portion to the additional portion, a content update rate is determined and used to select an indication of modification that is presented. The indication of modification provides the user with a visual indication that the content items presented by the display device are modified, and may include a subset of content items from the digital magazine server if the content update rate does not exceed a threshold.

24 Claims, 3 Drawing Sheets

Related U.S. Application Data filed on Jan. 15, 2013, provisional application No. 61/752,952, filed on Jan. 15, 2013.

(51) Int. Cl.
| | | |
|---|---|---|
| *G06Q 30/02* | (2012.01) | |
| *G06F 3/01* | (2006.01) | |
| *G06F 3/0482* | (2013.01) | |
| *G06F 17/30* | (2006.01) | |
| *G06F 3/0484* | (2013.01) | |
| *G06F 17/21* | (2006.01) | |

(52) U.S. Cl.
CPC ........ *G06F 3/04842* (2013.01); *G06F 17/211* (2013.01); *G06F 17/3089* (2013.01); *G06Q 30/0269* (2013.01); *G06Q 30/0276* (2013.01)

(56) References Cited

U.S. PATENT DOCUMENTS

| | | | |
|---|---|---|---|
| 7,673,340 B1* | 3/2010 | Cohen | G06F 11/3438 |
| | | | 379/266.08 |
| 8,230,075 B1 | 7/2012 | Weskamp et al. | |
| 8,260,915 B1* | 9/2012 | Ashear | G06F 13/00 |
| | | | 709/224 |
| 8,478,735 B1 | 7/2013 | Archambault | |
| 8,667,393 B2* | 3/2014 | Gerwin | 715/273 |
| 8,700,987 B2* | 4/2014 | Spalink | 715/232 |
| 8,788,487 B2 | 7/2014 | Stout et al. | |
| 8,825,872 B2 | 9/2014 | Reisman | |
| 8,826,169 B1 | 9/2014 | Yacoub et al. | |
| 9,037,592 B2* | 5/2015 | Walkingshaw | G06F 17/3053 |
| | | | 707/748 |
| 9,092,529 B1* | 7/2015 | Gyongyi | G06F 17/30867 |
| 2002/0073178 A1* | 6/2002 | Jalili | G06Q 30/02 |
| | | | 709/219 |
| 2002/0092019 A1* | 7/2002 | Marcus | G11B 27/034 |
| | | | 725/37 |
| 2002/0124050 A1* | 9/2002 | Middeljans | 709/203 |
| 2003/0004983 A1 | 1/2003 | Cohen | |
| 2005/0033657 A1* | 2/2005 | Herrington et al. | 705/26 |
| 2005/0055632 A1* | 3/2005 | Schwartz | G06F 17/211 |
| | | | 715/201 |
| 2005/0080684 A1* | 4/2005 | Blum | G06Q 30/06 |
| | | | 705/26.8 |
| 2005/0105134 A1 | 5/2005 | Moneypenny et al. | |
| 2005/0240865 A1* | 10/2005 | Atkins | G06F 17/217 |
| | | | 715/251 |
| 2006/0026182 A1* | 2/2006 | Takeda et al. | 707/100 |
| 2007/0011050 A1 | 1/2007 | Klopf et al. | |
| 2007/0150368 A1* | 6/2007 | Arora et al. | 705/26 |
| 2008/0002964 A1* | 1/2008 | Edwards | G03B 13/02 |
| | | | 396/374 |
| 2008/0033587 A1* | 2/2008 | Kurita | G06F 17/30713 |
| | | | 700/100 |
| 2008/0079972 A1* | 4/2008 | Goodwin et al. | 358/1.12 |
| 2008/0082903 A1 | 4/2008 | McCurdy et al. | |
| 2008/0120670 A1 | 5/2008 | Easton et al. | |
| 2009/0049374 A1 | 2/2009 | Echenberg | |
| 2009/0064003 A1* | 3/2009 | Harris | G06F 17/3089 |
| | | | 715/763 |
| 2010/0049770 A1 | 2/2010 | Ismalon | |
| 2010/0161369 A1 | 6/2010 | Farrell | |
| 2010/0262490 A1 | 10/2010 | Ito et al. | |
| 2010/0274815 A1 | 10/2010 | Vanasco | |
| 2010/0299642 A1* | 11/2010 | Merrell et al. | 715/863 |
| 2010/0306249 A1 | 12/2010 | Hill et al. | |
| 2010/0318571 A1 | 12/2010 | Pearlman | |
| 2011/0047368 A1 | 2/2011 | Sundaramurthy | |
| 2011/0052047 A1 | 3/2011 | Smith | |
| 2011/0191321 A1 | 8/2011 | Gade et al. | |
| 2011/0222769 A1 | 9/2011 | Galic et al. | |
| 2011/0234613 A1 | 9/2011 | Hanson et al. | |
| 2011/0238755 A1 | 9/2011 | Khan | |
| 2011/0246440 A1* | 10/2011 | Kocks | G06F 17/30781 |
| | | | 707/706 |
| 2011/0249903 A1 | 10/2011 | Duga et al. | |
| 2011/0265011 A1 | 10/2011 | Taylor et al. | |
| 2011/0302064 A1 | 12/2011 | Dunkeld et al. | |
| 2012/0066591 A1* | 3/2012 | Hackwell | G06F 3/0483 |
| | | | 715/702 |
| 2012/0079323 A1 | 3/2012 | Chincisan | |
| 2012/0079328 A1* | 3/2012 | Sawaguchi | G06F 11/0721 |
| | | | 714/47.1 |
| 2012/0089455 A1 | 4/2012 | Belani et al. | |
| 2012/0110678 A1 | 5/2012 | Kumble | |
| 2012/0124505 A1* | 5/2012 | St. Jacques, Jr. | G06F 3/0483 |
| | | | 715/776 |
| 2012/0147163 A1 | 6/2012 | Kaminsky | |
| 2012/0158476 A1 | 6/2012 | Neystadt | |
| 2012/0179572 A1* | 7/2012 | Hesse | 705/26.8 |
| 2012/0192093 A1* | 7/2012 | Migos et al. | 715/773 |
| 2012/0203640 A1 | 8/2012 | Karmarkar et al. | |
| 2012/0221555 A1 | 8/2012 | Byrne et al. | |
| 2012/0254188 A1 | 10/2012 | Koperski et al. | |
| 2012/0297490 A1 | 11/2012 | Barraclough et al. | |
| 2012/0304042 A1 | 11/2012 | Pereira et al. | |
| 2013/0021377 A1 | 1/2013 | Doll | |
| 2013/0024757 A1 | 1/2013 | Doll et al. | |
| 2013/0111334 A1* | 5/2013 | Liang | G06F 3/0488 |
| | | | 715/252 |
| 2013/0111395 A1 | 5/2013 | Ying et al. | |
| 2013/0145259 A1* | 6/2013 | Kiefer, III | G06Q 30/02 |
| | | | 715/249 |
| 2013/0226663 A1 | 8/2013 | Jahid | |
| 2013/0290414 A1 | 10/2013 | Rait | |
| 2013/0332593 A1* | 12/2013 | Patnaikuni | H04L 29/06884 |
| | | | 709/224 |
| 2014/0028685 A1 | 1/2014 | Weskamp et al. | |
| 2014/0032635 A1 | 1/2014 | Pimmel et al. | |
| 2014/0033134 A1 | 1/2014 | Pimmel et al. | |
| 2014/0033202 A1 | 1/2014 | Weskamp et al. | |
| 2014/0067825 A1 | 3/2014 | Oztaskent et al. | |
| 2014/0068654 A1* | 3/2014 | Marlow | H04L 65/4084 |
| | | | 725/28 |
| 2014/0074934 A1 | 3/2014 | Van Hoff et al. | |
| 2014/0075289 A1 | 3/2014 | Brant | |
| 2014/0075296 A1 | 3/2014 | Schaad et al. | |
| 2014/0173397 A1 | 6/2014 | Pereira et al. | |
| 2015/0019957 A1 | 1/2015 | Ying et al. | |
| 2015/0019958 A1 | 1/2015 | Ying et al. | |
| 2015/0127565 A1 | 5/2015 | Chevalier | |

OTHER PUBLICATIONS

PCT International Search Report and Written Opinion for PCT/US2013/059297, Jan. 28, 2014, 15 Pages.

PCT International Search Report and Written Opinion for PCT/US2013/059298, Jan. 28, 2014, 15 Pages.

Office Action for Chinese Patent Application No. CN 201380053683.0, Aug. 30, 2016, 32 Pages.

2$^{nd}$ Office Action for Chinese Patent Application No. CN 201380053683.0, Apr. 27, 2017, 29 Pages \* cited by examiner

INTERACTIONS FOR VIEWING CONTENT IN A DIGITAL MAGAZINE

CROSS REFERENCE TO RELATED APPLICATIONS

This application claims the benefit of U.S. Provisional Application No. 61/700,307, filed Sep. 12, 2012, U.S. Provisional Application No. 61/752,951, filed Jan. 15, 2013, and U.S. Provisional Application No. 61/752,952, filed Jan. 15, 2013, each of which is incorporated by reference herein in its entirety.

BACKGROUND

This invention relates generally to digital magazines, specifically to providing an indication of modification of content from a digital magazine that is presented.

A digital magazine includes content items selected from various sources for presentation to its users in one or more digital magazines. Each digital magazine includes various pages with one or more content items presented on a page, allowing a user to navigate through content items by viewing different pages. However, conventional digital magazines do not give users visual cues when the user navigates through various pages. For example, conventional digital magazines do not provide users with information about content items presented on pages between a displayed page and an additional page, preventing users from easily browsing through the digital magazine for content items of interest.

SUMMARY

A digital magazine is a personalized, customizable application for displaying content items to a user of a client device (e.g., a mobile communication device, tablet, computer, and any other suitable computing system). For example, a digital magazine server selects content items for presentation to a user based on the user's interests and preferences. The content items are sent with instructions for display to the user on a client device.

A user may navigate through various content items presented by the digital magazine server by interacting with a client device displaying one or more content items. In one embodiment, the user interacts with a portion of the display device and traverses the display device from the portion to an additional portion of the display device. For example, the user contacts the portion of the display device and continues contacting the display device while traversing from the portion to the additional portion. However, the user may interact with the client device in a variety of ways to update the displayed content items. Examples of interactions with the client device include: positioning a stylus or other object (e.g., a finger, a stylus pen, etc) within a threshold distance above the surface of a portion of the display device and traversing to a location above the surface of the additional portion of the display device, positioning the stylus or other object within the threshold distance above a portion of the display device presenting the content item and traversing towards the surface of the display device, maintaining eye contact with a portion of the display device and maintaining eye contact with the display device while traversing from the portion to the additional portion.

Based at least in part on a rate at which the user traverses from the portion of the display device to the additional portion, a content update rate is determined. For example, the content update rate is based at least in part on the time taken to traverse from the portion to the additional portion. The content update rate may also be based on the position of the additional portion relative to the portion, the distance between the portion and the additional portion, or other suitable information. Based at least in part on the content update rate, an indication of modification of the content items is displayed. For example, the indication of modification that is displayed is based on a comparison between the content update rate and a threshold. The indication of modification may include an image, a sequence of images, video data, or other suitable data. In one embodiment, if the content update rate exceeds the threshold, the indication of modification is graphical or text data indicating that the content items being displayed are modified, while if the content update rate is less than or equal to the threshold, the indication of modification includes a subset of content items included in the digital magazine. For example, the subset of content items are presented from one or more pages in a digital magazine in a sequence between a page of the digital magazine being displayed and an additional page of the digital magazine.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A digital magazine server retrieves content from one or more sources and generates a personalized, customizable digital magazine for a user based on the retrieved content. The generated digital magazine is retrieved by a digital magazine application executing on a computing device (such as a mobile communication device, tablet, computer, or any other suitable computing system) and presented to the user. For example, based on selections made by the user and/or on behalf of the user, the digital server application generates a digital magazine including one or more sections including content items retrieved from a number of sources and personalized for the user. The generated digital magazine allows the user to more easily consume content that interests and inspires the user by presenting content items in an easily navigable interface via a computing device.

The digital magazine may be organized into a number of sections that each include content having a common characteristic (e.g., content obtained from a particular source). For example, a section of the digital magazine includes articles from an online news source (such as a website for a news organization), another section includes articles from a third-party-curated collection of content associated with a particular topic (e.g., a technology compilation), and an additional section includes content obtained from one or more accounts associated with the user and maintained by one or more social networking systems. For purposes of illustration, content included in a section is referred to herein as "content items" or "articles," which may include textual articles, pictures, videos, products for sale, user-generated content (e.g., content posted on a social networking system), advertisements, and any other types of content capable of display within the context of a digital magazine.

System Architecture

Figure 1:
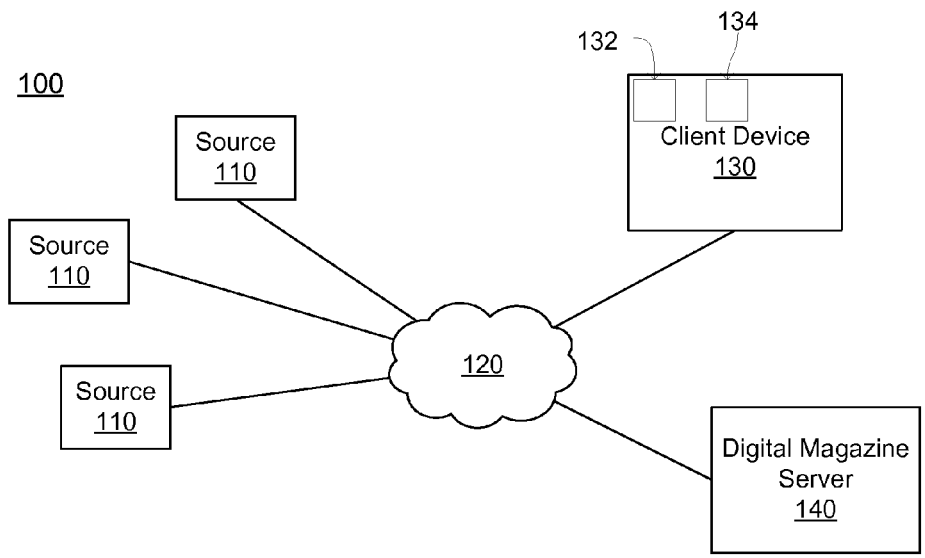
FIG. 1 is a block diagram of a system environment in which a digital magazine server operates, in accordance with an embodiment of the invention.

FIG. 1 is a block diagram of a system environment 100 for a digital magazine server 140. The system environment 100 shown by FIG. 1 comprises one or more sources 110, a network 120, a client device 130, and the digital magazine server 140. In alternative configurations, different and/or additional components may be included in the system environment 100. The embodiments described herein can be adapted to online systems that are not digital magazine severs 140.

A source 110 is a computing system capable of providing various types of content to a client device 130. Examples of content provided by a source 110 include text, images, video, or audio on web pages, web feeds, social networking information, messages, or other suitable data. Additional examples of content include user-generated content such as blogs, tweets, shared images, video or audio, social networking posts, and social networking status updates. Content provided by a source 110 may be received from a publisher (e.g., stories about news events, product information, entertainment, or educational material) and distributed by the source 110, or a source 110 may be a publisher of content it generates. For convenience, content from a source, regardless of its composition, may be referred to herein as an "article," a "content item," or as "content." A content item may include various types of content, such as text, images, and video.

The sources 110 communicate with the client device 130 and the digital magazine server 140 via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The client device 130 is one or more computing devices capable of receiving user input as well as transmitting and/or receiving data via the network 120. In one embodiment, the client device 130 is a conventional computer system, such as a desktop or a laptop computer. Alternatively, the client device 130 may be a device having computer functionality, such as a personal digital assistant (PDA), a mobile telephone, a smartphone or another suitable device. In one embodiment, the client device 130 executes an application allowing a user of the client device 110 to interact with the digital magazine server 140. For example, an application executing on the client device 130 communicates instructions or requests for content items to the digital magazine server 140 to modify content presented to a user of the client device 130. As another example, the client device 130 executes a browser that receives pages from the digital magazine server 140 and presents the pages to a user of the client device 130. In another embodiment, the client device 130 interacts with the digital magazine server 140 through an application programming interface (API) running on a native operating system of the client device 110, such as IOS® or ANDROID™. While FIG. 1 shows a single client device 130, in various embodiments, any number of client devices 130 may communicate with the digital magazine server 140.

A display device 132 included in the client device 130 presents content items to a user of the client device 130. Examples of the display device 132 include a liquid crystal display (LCD), an organic light emitting diode (OLED) display, an active matrix liquid crystal display (AMLCD), or any other suitable device. Different client devices 130 may have display devices 132 with different characteristics. For example, different client devices 132 have display devices 132 with different display areas, different resolutions, or differences in other characteristics.

One or more input devices 134 included in the client device 130 receive input from the user. Different input devices 134 may be included in the client device 130. For example, the client device 130 includes a touch-sensitive display for receiving input data, commands, or information from a user. Using a touch-sensitive display allows the client device 130 to combine the display device 132 and an input device 134, simplifying user interaction with presented content items. In other embodiments, the client device 130 may include a keyboard, a trackpad, a mouse, or any other device capable of receiving input from a user. In another example, the input device 134 is configured to receive information from a user of the client device through a touchless interface. Examples of a touchless interface include sensors, such as an image capture device, to receive gestures from a client device user without the user physically contacting the display device 132 or the client device 130. Additionally, the client device may include multiple input devices 134 in some embodiments. Inputs received via the input device 134 may be processed by a digital magazine application associated with the digital magazine server 140 and executing on the client device 130 to allow a client device user to interact with content items presented by the digital magazine server 140.

The digital magazine server 140 receives content items from one or more sources 110, generates pages in a digital magazine by processing the received content, and provides the pages to the client device 130. As further described below in conjunction with FIG. 2, the digital magazine server 140 generates one or more pages for presentation to a user based on content items obtained from one or more sources 110 and information describing organization and presentation of content items. For example, the digital magazine server 140 determines a page layout specifying positioning of content items relative to each other based on information associated with a user and generates a page including the content items arranged according to the determined layout for presentation to the user via the client device 130. This allows the user to access content items via the client device 130 in a format that enhances the user's interaction with and consumption of the content items. For example, the digital magazine server 140 provides a user with content items in a format similar to the format used by print magazines. By presenting content items in a format similar to a print magazine, the digital magazine server 140 allows a user to interact with content items from multiple sources 110 via the client device 130 with less inconvenience from horizontally or vertically scrolling to access various content items.

Figure 2:
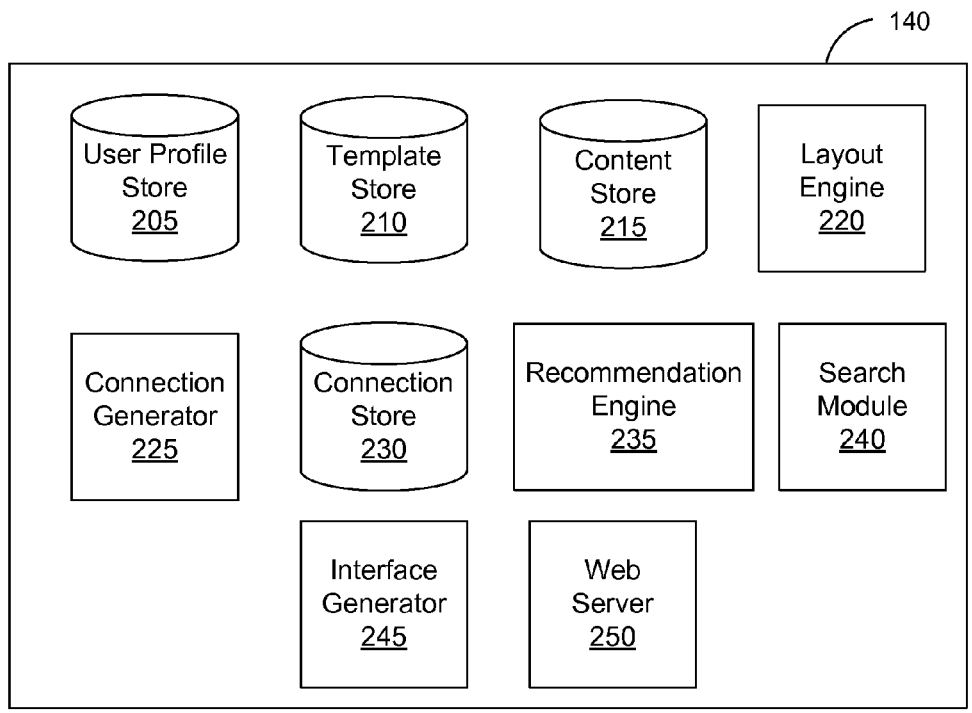
FIG. 2 is a block diagram of a digital magazine server, in accordance with an embodiment of the invention.

FIG. 2 is a block diagram of an architecture of the digital magazine server 140. The digital magazine server 140 shown in FIG. 2 includes a user profile store 205, a template store 210, a content store 215, a layout engine 220, a connection generator 225, a connection store 230, a recommendation engine 235, a search module 240, an interface generator 245, and a web server 250. In other embodiments, the digital magazine server 140 may include additional, fewer, or different components for various applications. Conventional components such as network interfaces, security functions, load balancers, failover servers, management and network operations consoles, and the like are not shown so as to not obscure the details of the system architecture.

Each user of the digital magazine server 140 is associated with a user profile, which is stored in the user profile store 205. A user profile includes declarative information about the user that was explicitly shared by the user and may also include profile information inferred by the digital magazine server 140. In one embodiment, a user profile includes multiple data fields, each describing one or more attributes of the corresponding social networking system user. Examples of information stored in a user profile include biographic, demographic, and other types of descriptive information, such as gender, hobbies or preferences, location, or other suitable information. A user profile in the user profile store 205 also includes data describing interactions by a corresponding user with content items presented by the digital magazine server 140. For example, a user profile includes a content item identifier, a description of an interaction with the content item corresponding to the content item identifier, and a time when the interaction occurred.

While user profiles in the user profile store 205 are frequently associated with individuals, allowing individuals to provide and receive content items via the digital magazine server 140, user profiles may also be stored for entities such as businesses or organizations. This allows an entity to provide or access content items via the digital magazine server 140. An entity may post information about itself, about its products or provide other content items associated with the entity to users of the digital magazine server 140. For example, users of the digital magazine server 140 may receive a digital magazine or section including content items associated with an entity via the digital magazine server 140.

The template store 210 includes page templates each describing a spatial arrangement ("layout") of content items relative to each other on a page for presentation by a client device 130. A page template includes one or more slots, each configured to present one or more content items. In some embodiments, slots in a page template may be configured to present a particular type of content item or to present a content item having one or more specified characteristics. For example, a slot in a page template is configured to present an image while another slot in the page template is configured to present text data. Each slot has a size (e.g., small, medium, or large) and an aspect ratio. One or more page templates may be associated with types of client devices 130, allowing content items to be presented in different relative locations and with different sizes when the content items are viewed using different client devices 130. Additionally, page templates may be associated with sources 110, allowing a source 110 to specify the format of pages presenting content items received from the source 110. For example, an online retailer is associated with a page template to allow the online retailer to present content items via the digital magazine server 140 with a specific organization. Examples of page templates are further described in U.S. patent application Ser. No. 13/187,840, filed on Jul. 21, 2011, which is hereby incorporated by reference in its entirety.

The content store 215 stores objects that each represent various types of content. For example, the content store 215 stores content items received from one or more sources 115 within a threshold time of a current time. Examples of content items stored by the content store 215 include a page post, a status update, a photograph, a video, a link, an article, video data, audio data, a check-in event at a location, or any other type of content. A user may specify a section including content items having a common characteristic, and the common characteristic is stored in the content 215 store along with an association with the user profile or the user specifying the section.

The layout engine 220 retrieves content items from one or more sources 110 or from the content store 215 and generates a page including the content items based on a page template from the template store 210. Based on the retrieved content items, the layout engine 220 may identify candidate page templates from the template store 210, score the candidate page templates based on characteristics of the slots in different candidate page templates and based on characteristics of the content items. Based on the scores associated with candidate page templates, the layout engine 220 selects a page template and associates the retrieved content items with one or more slots to generate a page where the retrieved content items are presented relative to each other and sized based on their associated slots. When associating a content item with a slot, the layout engine 220 may associate the content item with a slot configured to present a specific type of content item or to present content items having one or more specified characteristics. An example of using a page template to present content items is further described in U.S. patent application Ser. No. 13/187,840, filed on Jul. 21, 2011, which is hereby incorporated by reference in its entirety.

The connection generator 225 monitors interactions between users and content items presented by the digital magazine server 140. Based on the interactions, the connection generator 225 determines connections between various content items, connections between users and content items, or connections between users of the digital magazine server 140. For example, the connection generator 225 identifies when users of the digital magazine server 140 provide feedback about a content item, access a content item, share a content item with other users, or perform other actions with content items. In some embodiments, the connection generator 225 retrieves data describing user interaction with content items from the user's user profile in the user profile store 205. Alternatively, user interactions with content items are communicated to the connection generator 225 when the interactions are received by the digital magazine server 140. The connection generator 225 may account for temporal information associated with user interactions with content items. For example, the connection generator 225 identifies user interactions with a content item within a specified time interval or applies a decay factor to identified user interactions based on times associated with interactions. The connection generator 225 generates a connection between a user and a content item if the user's interactions with the content item satisfy one or more criteria. In one embodiment, the connection generator 225 determines one or more weights specifying a strength of the connection between the user and the content item based on user interactions with the content item that satisfy one or more criteria. Generation of connections between a user and a content item is further described in U.S. patent application Ser. No. 13/905,016, filed on May 29, 2013, which is hereby incorporated by reference in its entirety.

If multiple content items are connected to a user, the connection generator 225 establishes implicit connections between each of the content items connected to the user. In one embodiment, the connection generator 225 maintains a user content graph identifying the implicit connections between content items connected to a user. In one embodiment, weights associated with connections between a user and content items are used to determine weights associated with various implicit connections between content items. User content graphs for multiple users of the digital magazine server 140 are combined to generate a global content graph describing connections between various content items provided by the digital magazine server 140 based on user interactions with various content items. For example, the global content graph is generated by combining user content graphs based on mutual connections between various content items in user content graphs.

In one embodiment, the connection generator 225 generates an adjacency matrix from the global content graph or from multiple user content graphs and stores the adjacency matrix in the connection store 230. The adjacency matrix describes connections between content items. For example, the adjacency matrix includes identifiers of content items and weights representing the strength or closeness of connections between content items based on the global content graph. As an example, the weights indicate a degree of similarity in subject matter or similarity of other characteristics associated with various content items. In other embodiments, the connection store 230 includes various adjacency matrices determined from various user content graphs; the adjacency matrices may be analyzed to generate an overall adjacency matrix for content items provided by the digital magazine server 140. Graph analysis techniques may be applied to the adjacency matrix to rank content items, to recommend content items to a user, or to otherwise analyze relationships between content items. An example of the adjacency matrix is further described in U.S. patent application Ser. No. 13/905,016, filed on May 29, 2013, which is hereby incorporated by reference in its entirety.

In addition to identifying connections between content items, the connection generator 225 may also determine a social proximity between users of the digital magazine server 140 based on interactions between users and content items. The digital magazine server 140 determines social proximity, or "social distance," between users using a variety of techniques. For example, the digital magazine server 140 analyzes additional users connected to each of two users of the digital magazine server 140 within a social networking system to determine the social proximity of the two users. In another example, the digital magazine server 140 determines social proximity between a first and a second user by analyzing the first user's interactions with content items posted by the second user, whether the content item is posted using the digital magazine server 140 or on another social networking system. Additional examples for determining social proximity between users of the digital magazine server 140 are described in U.S. patent application Ser. No. 13/905,016, which is incorporated by reference in its entirety. In one embodiment, the connection generator 225 determines a connection confidence value between a user and an additional user of the digital magazine server 140 based on the user's and the additional user's common interactions with particular content items. The connection confidence value may be a numerical score representing a measure of closeness between the user and the additional user. For example, a larger connection confidence value indicates a greater similarity between the user and the additional user. In one embodiment, if a user has at least a threshold connection confidence value with another user, the digital magazine server 140 stores a connection between the user and the additional user in the connection store 230.

Using data from the connection store 230, the recommendation engine 235 identifies content items from one or more sources 110 for recommending to a digital magazine server user. Hence, the recommendation engine 235 identifies content items potentially relevant to a user. In one embodiment, the recommendation engine 235 retrieves data describing interactions between a user and content items from the user's user profile and data describing connections between content items, and/or connections between users from the connection store 230. In one embodiment, the recommendation engine 235 uses stored information describing content items (e.g., topic, sections, subsections) and interactions between users and various content items (e.g., views, shares, saved, links, topics read, or recent activities) to identify content items that may be relevant to a digital magazine server user. For example, content items having an implicit connection of at least a threshold weight to a content item with which the user interacted are recommended to the user. As another example, a the recommendation engine 235 presents a user with content items having one or more attributes in common with a content item with which an additional user having a threshold connection confidence score with the user interacted. Recommendations for additional content items may be presented to a user when the user views a content item using the digital magazine, may be presented as a notification to the user by the digital magazine server 140, or may be presented to the user through any suitable communication channel.

In one embodiment, the recommendation engine 235 applies various filters to content items received from one or more sources 110 or from the content store 215 to efficiently provide a user with recommended content items. For example, the recommendation engine 235 analyzes attributes of content items in view of characteristics of a user retrieved from the user's user profile. Examples of attributes of content items include a type (e.g., image, story, link, video, audio, etc.), a source 110 from which a content item was received, time when a content item was retrieved, and subject matter of a content item. Examples of characteristics of a user include biographic information about the user, users connected to the user, and interactions between the user and content items. In one embodiment, the recommendation engine 235 analyzes attributes of content items in view of a user's characteristics for a specified time period to generate a set of recommended content items. The set of recommended content items may be presented to the user or may be further analyzed based on user characteristics and on content item attributes to generate more refined set of recommended content items. A setting included in a user's user profile may specify a length of time that content items are analyzed before identifying recommended content items to the user, allowing a user to balance refinement of recommended content items with time used to identify recommended content items.

The search module 240 receives a search query from a user and retrieves content items from one or more sources 110 based on the search query. For example, content items having at least a portion of an attribute matching at least a portion search query are retrieved from one or more sources 110. The user may specify sources 110 from which content items are received through settings maintained by the user's user profile or by identifying one or more sources in the search query. In one embodiment, the search module 240 generates a section of the digital magazine including the content items identified based on the search query, as the identified content items have a common attribute of their association with the search query. Presenting identified content items identified from a search query allows a user to more easily identify additional content items at least partially matching the search query when additional content items are provided by sources 110.

To more efficiently identify content items based on search queries, the search module 110 may index content items, groups (or sections) of content items, and user profile information. In one embodiment, the index includes information about various content items, such as author, source, topic, creation data/time, user interaction information, document title, or other information capable of uniquely identifying the content item. Search queries are compared to information maintained in the index to identify content items for presentation to a user. The search module 140 may present identified content items based on a ranking. One or more factors associated with the content items may be used to generate the ranking Examples of factors include: global popularity of a content item among users of the digital magazine server 140, connections between users interacting with a content item and the user providing the search query, and information from a source 110. Additionally, the search module 240 may assign a weight to the index information associated with each content item selected based on similarity between the index information and a search query and rank the content items based on their weights. For example, content items identified based on a search query are presented in a section of the digital magazine in an order based in part on the ranking of the content items.

To increase user interaction with the digital magazine, the interface generator 245 maintains instructions associating received input with actions performed by the digital magazine server 140 or by a digital magazine application executing on a client device 130. For example, instructions maintained by the interface generator 245 associate types of inputs or specific inputs received via an input device 132 of a client device 130 with modifications to content presented by a digital magazine. As an example, if the input device 132 is a touch-sensitive display, the interface generator 245 includes instructions associating different gestures with navigation through content items or presented via a digital magazine. Instructions from the interface generator 245 are communicated to a digital magazine application or other application executing on a client device 130 on which content from the digital magazine server 140 is presented. Inputs received via an input device 132 of the client device 130 are processed based on the instructions when content items are presented via the digital magazine server 140 is presented to simplify user interaction with content presented by the digital magazine server 140.

The web server 250 links the digital magazine server 140 via the network 120 to the one or more client devices 130, as well as to the one or more sources 110. The web server 250 serves web pages, as well as other content, such as JAVA®, FLASH®, XML and so forth. The web server 250 may retrieve content item from one or more sources 110. Additionally, the web server 250 communicates instructions for generating pages of content items from the layout engine 220 and instructions for processing received input from the interface generator 245 to a client device 130 for presentation to a user. The web server 250 also receives requests for content or other information from a client device 130 and communicates the request or information to components of the digital magazine server 140 to perform corresponding actions. Additionally, the web server 250 may provide application programming interface (API) functionality to send data directly to native client device operating systems, such as IOS®, ANDROID™, WEBOS®, or BlackberryOS.

For purposes of illustration, FIG. 2 describes various functionalities provided by the digital magazine server 140. However, in other embodiments, the above-described functionality may be provided by a digital magazine application executing on a client device 130, or may be provided by a combination of the digital magazine server 140 and a digital magazine application executing on a client device 130. For example, a digital magazine application executing on the client device 130 receives an input from a user and displays an indication of the modification of content items based on a content update rate based at least in part on the rate of the input. Alternatively, the digital magazine server 140 and the client device 130 operate in conjunction with each other to determine an indication of modification of content items presented via the client device 130. For example, the digital magazine server 140 determines the indication of modification to present, while a digital magazine application executing on the client device 130 presents the indication of the modification of content items.

Page Templates

Figure 3:
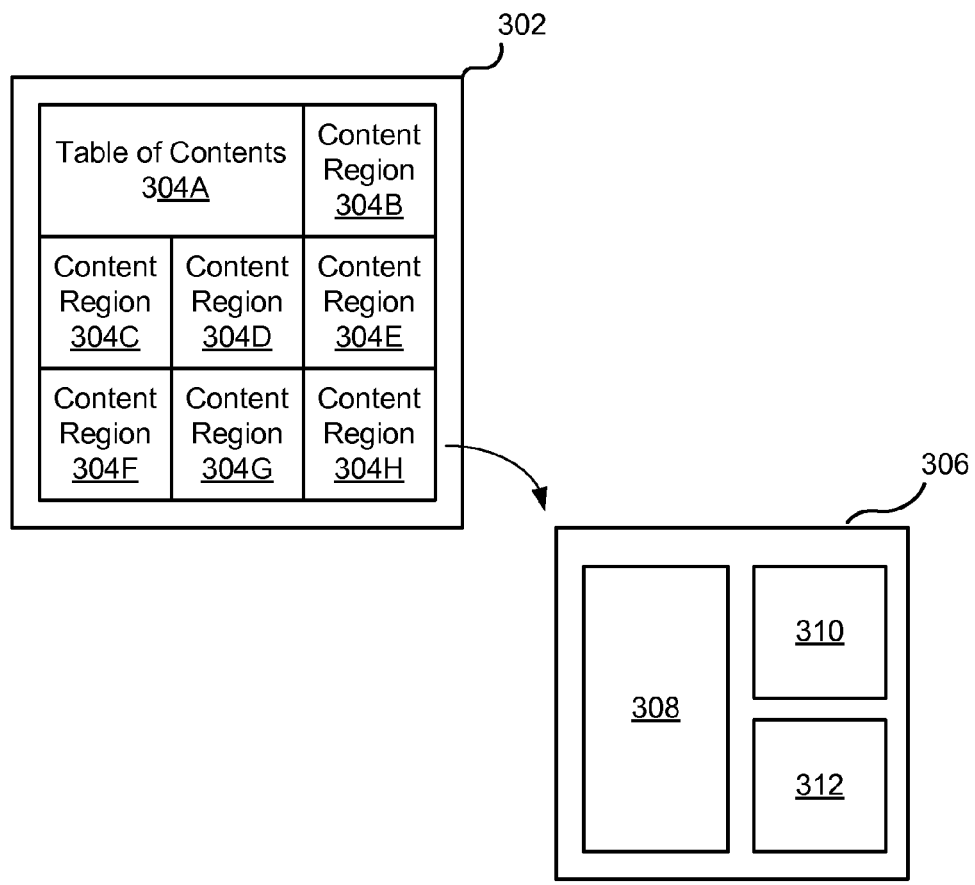
FIG. 3 is an example of presentation of content items in a digital magazine using a page template, in accordance with an embodiment of the invention.

FIG. 3 illustrates an example page template 302 having multiple rectangular slots each configured to present a content item. Other page templates with different configurations of slots may be used by the digital magazine server 140 to present one or more content items received from sources 110. As described above in conjunction with FIG. 2, in some embodiments, one or more slots in a page template are reserved for presentation of content items having specific characteristics or for presentation of a specific type of content item. In one embodiment, the size of a slot may be specified as a fixed aspect ratio or using fixed dimensions. Alternatively, the size of a slot may be flexible, where the aspect ratio or one or more dimensions of a slot is specified as a range, such as a percentage of a reference or a base dimension. Arrangement of slots within a page template may also be hierarchical. For example, a page template is organized hierarchically, where an arrangement of slots may be specified for the entire page template or for one or more portions of the page template.

In the example of FIG. 3, when a digital magazine server 140 generates a page for presentation to a user, the digital magazine server 140 populates slots in a page template 302 with content items. Information identifying the page template 302 and associations between content items and slots in the page template 302 is stored and used to generate the page. For example, to present a page to a user, the layout engine 220 identifies the page template 102 from the template store 210 and retrieves content items from one or more sources 110 or from the content store 215. The layout engine 220 generates data or instructions associating content items with slots within the page template 302. Hence, the generated page includes various "content regions" presenting one or more content items associated with a slot in a location specified by the slot.

A content region 304 may present image data, text, data, a combination of image and text data, or any other information retrieved from a corresponding content item. For example, in FIG. 3, the content region 304A represents a table of contents identifying sections of a digital magazine, and content associated with the various sections are presented in content regions 304B-304H. For example, content region 304A includes text or other data indicating that the presented data is a table of contents, such the text "Cover Stories Featuring," followed by one or more identifiers associated with various sections of the digital magazine. In one embodiment, an identifier associated with a section describes a characteristic common to at least a threshold number of content items in the section. For example, an identifier refers to the name of a user of social network from which content items included in the section are received. As another example, an identifier associated with a section specifies a topic, an author, a publisher (e.g., a newspaper, a magazine) or other characteristic associated with at least a threshold number of content items in the section. Additionally, an identifier associated with a section may further specify content items selected by a user of the digital magazine server 140 and organized as a section. Content items included in a section may be related topically and include text and/or images related to the topic.

Sections may be further organized into subsections, with content items associated with one or more subsections presented in content regions. Information describing sections or subsections, such as a characteristic common to content items in a section or subsection, may be stored in the content store 215 and associated with a user profile to simplify generation of a section or subsection for the user. A page template associated with a subsection may be identified, and slots in the page template associated with the subsection used to determine presentation of content items from the subsection relative to each other. Referring to FIG. 3, the content region 304H includes a content item associated with a newspaper to indicate a section including content items retrieved from the newspaper. When a user interacts with the content region 304, a page template associated with the section is retrieved, as well as content items associated with the section. Based on the page template associated with the section and the content items, the digital magazine server 140 generates a page presenting the content items based on the layout described by the slots of the page template. For example, in FIG. 3, the section page 306 includes content regions 308, 310, 312 presenting content items associated with the section. The content regions 308, 310, 312 may include content items associated with various subsections including content items having one or more common characteristics (e.g., topics, authors, etc.). Hence, a subsection may include one or more subsections, allowing hierarchical organization and presentation of content items by a digital magazine.

Gestures for Viewing Content in a Digital Magazine

Figure 4:
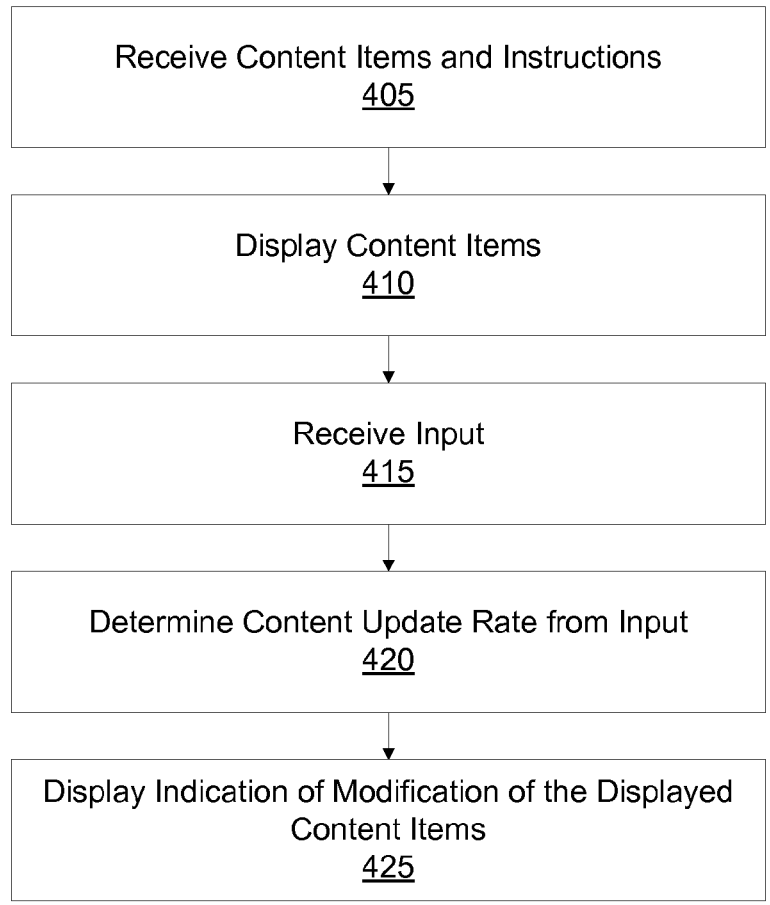
FIG. 4 is a flow chart of a method for displaying updates to one or more content items in a digital magazine, in accordance with an embodiment of the invention.

FIG. 4 is a flowchart of one embodiment of a method 400 for displaying updates to one or more content items in a digital magazine or a digital collection. In other embodiments, the method may include different and/or additional steps than those shown in FIG. 4. The functionality described in conjunction with the digital magazine server 140 in FIG. 4 may be provided by the interface generator 245 in one embodiment or may be provided by any other suitable component, or components, in other embodiments.

Alternatively, the client device 130 executes one or more instructions associated with the digital magazine server 140, such as an application associated with the digital magazine server 140, to provide the functionality described in conjunction with FIG. 4.

The client device 130 receives 405 one or more content items from a digital magazine server 140 and instructions for displaying the one or more content items on the client device 130 to a user of the digital magazine server 140. For example, the digital magazine server 140 sends the one or more content items and instructions in response to a request for content items received from the client device 130, or may send one or more content items and instructions for displaying the content items to the client device 130 at various time intervals. In one embodiment, the instructions for displaying one or more of the content items are retrieved from a digital magazine application executing on the client device 130, while the content items are received 405 from the digital magazine server 140, which retrieves the content items from the content store 215 or from one or more sources 110. Alternatively, the instructions may include page templates retrieved from the template store 210 of the digital magazine server 140 that describe relative positioning of content items to each other when displayed. As further described above in conjunction with FIGS. 2 and 3, the page templates have one or more slots specifying locations in which content items are displayed in a page of a digital magazine.

Based on the instructions, the client device 130 displays 410 one or more of the content items in various display regions of a display device 132 included on the client device 130. For example, content regions are displayed 410 in various positions in the display device 132 determined by the slots in a page template. In one embodiment, the content items are displayed in a page of a digital magazine presented via the display device 132.

The client device 130 receives 415 an input from the user interacting with a portion of the display device 132 of the client device 130. For example, the user interacts with a display region presenting a content item in the portion of the display device 132. Alternatively, the portion of the display device 132 corresponds to physical area of the display device 132 specified by information included in an application associated with the digital magazine server 140 and executing on the client device 130. In one embodiment, the input is received 415 when the user interacts with the portion of the display device 132 and traverses from the portion of the display device 132 to an additional portion of the display device 132. For example, if the display device 132 is a touch-sensitive display, the input is received 415 when the user contacts the portion of the display device 132 and maintains physical contact with the display device 132 while traversing from the portion to the additional portion of the display device 132.

In one embodiment, the portion is an area of the display region in which a feature of a content item is displayed. Examples of displayed features of the content item include one or more corners of the content item, a border, a title, a section, an image or video, or a visual indication of a location such as a point, an icon, or a button. In some embodiments, the received input traverses a path from the portion to the additional portion. The path may have any suitable shape, such as an "x," a diagonal line, and a curved line.

In other embodiments, the input may be received 415 through other suitable methods. For example, the input is received 415 when the user contacts the portion of the display device 132 with a physical stylus and continues contacting the display device 132 with the physical stylus while traversing to the additional portion of the display device 132. Other examples of inputs received 415 include a user positioning a stylus or other object (e.g., a finger, a stylus pen, etc.) within a threshold distance above the surface of the portion of the display device 132 and traversing above the surface of the display device 132, a user positioning the stylus or other object within the threshold distance above the surface of the portion of the display device 132 and traversing towards the surface of the display device 132, a sensor identifying eye contact by the user with the portion of the display device 132 and the user maintaining eye contact with the display device 132 while traversing from the portion to the additional portion, a sensor identifying heat signatures of a physical stylus contacting the portion of the display device 132, a sensor identifying resistance of contact with the portion of the display device 132, receiving an audio command via an audio capture device, moving the client device 130 in one or more directions, or any other suitable type of input. In an embodiment where the input is an audio command, the input is received 415 when a phrase or other audio signal with a specific signature is received by a microphone or other audio capture device included on the client device 130.

Based at least in part on a rate at which the user traverses from the portion of the display device 132 to the additional portion of the display device 132, the client device 130 determines 420 a content update rate, which determines how quickly content items are modified or an amount of content items to be modified. In one embodiment, the rate describes a time from the interaction with the portion of the display device 132 to interacting with the additional portion of the display device 132. Additionally, the rate may have a direction indication describing the position on the display device 132 of the additional portion relative to the position on the display device of the portion. For example, the rate has a positive direction if the additional portion has a position in a first direction relative to the portion and the rate has a negative direction if the additional portion has a position in a second direction relative to the portion. In some embodiments, the rate also has a magnitude that is based at least in part on a distance between the portion and the additional portion. For example, the magnitude is based on a number of pixels the portion and the additional portion of the display device 132.

In one embodiment, the content update rate is determined 420 based on the rate at which the user traverses from the portion of the display device 132 to the additional portion of the display device 132. Additional factors, such as attributes of the user may be used to determine 420 the content update rate in some embodiments. Alternatively, the content update rate is based on the rate, a maximum rate and a minimum rate. For example, the content update rate is normalized to a range within the minimum and maximum rates, which are determined based on information associated with the user by the digital magazine server 140 (e.g., historical content update rates from prior user inputs).

Based at least in part on the determined content update rate, the client device 130 displays 425 an indication that the content items displayed by the display device 132 are being modified. The indication of the modification is data providing a visual representation that the content displayed by the client device 130 is being modified. In various embodiments, the indication can be an image, a sequence of images, or video data. The modification may also provide audio or haptic feedback indicating displayed content items are being modified in some embodiments. Different indications of modification are displayed 425 based on the content update rate, allowing the displayed indication to provide information representing the amount of modification to the displayed content items or representing an amount of content items between the displayed content items and the subsequently displayed content items.

In one embodiment, the content update rate is compared to a threshold to determine a format for the displayed indication of modification. For example, if the content update rate is less than or equal to the threshold value, the indication of modification includes portions of at subset of content items; for example, the indication of modification presents content items from one or more pages of a digital magazine other than the page that includes the one or more currently displayed content items. If the content update rate exceeds the threshold, the indication of modification is an image or other data that indicates the displayed content items are updated; for example, the displayed indication of modification is an image or images indicating displayed content items are updated.

In one embodiment, the threshold is based on information associated with the user by the digital magazine server 140. For example, information in the user's user profile or settings stored by an application executing on the client device 130 and associated with the digital magazine server 140 are used to select the threshold. Alternatively, the threshold is determined based on previous content update rates of the user. In some embodiments, the content update rate is compared to various threshold values to identify a range including the content update rate. An indication of modification associated with the range including the content update rate is then displayed 425 to the user via the client device 130. The ranges may be based on information associated with the user, based on previous content update rates associated with the user, or based on any other suitable information.

Referring to a specific example, the client device 130 displays 410 a page of a digital magazine that includes one or more content items positioned relative to each other based on a page template. The digital magazine includes multiple pages, with each page including various content items arranged based on information in one or more page templates associated with a page. Hence, the user access different pages of the digital magazine to access various content items in the digital magazine. To access different pages of the digital magazine, the user interacts with the client device 130, which identifies a page of the digital magazine to display instead of currently displayed page based on the interaction. In an embodiment where the client device 130 has a touch-sensitive display device 132, the user may access different pages of the digital magazine by contacting a portion of the display device 132 and traversing to an additional portion to provide the input. As described above in conjunction with FIG. 4, based at least in part on the rate of the traversal from the position to the additional position, a content update rate is determined 430 and use to determine an indication of modification displayed by the client device 130. In this example, the indication provides information describing that the displayed page of the digital magazine server is being updated.

For example, if the content update rate is greater than a threshold, the indication is one or more images providing a visual representation of turning printed pages. The visual representations of turning printed pages may comprise images of page turns of and images of page edge turns. In one embodiment, images of page turns include content items or portions of content items included on a page, while images of page edge turns shows images representing edges of the pages and not the content on the pages, providing the feel of a quick skim of pages. For example, the page edge turns present images of pages that do not include content items displayed in the display device 132. Because the page turn includes content items from one or more pages in this example, a page turn provides the feel of a slow skim of pages. For example, a page turn displays one or more content items from a page or a title of a page. As an example, if a user is navigating through an "Entertainment" section of the digital magazine, if the content update rate is less than a threshold, the page turns may present titles of pages, such as "Games," "Sports," or "Movies." In one embodiment, page edge turns are selected as the indication of modification when a content update rate exceeding the threshold and page turns are selected as the indication of modification when the content update rate is less than or equal to the threshold. Additionally, the direction of the page turns and page edge turns may be determined by the direction in which the user traverses from the portion to the additional portion in some embodiments.

For example, pages of the digital magazine from which content items for the indication of modification or from which content items are displayed are selected from pages stored in the memory of the client device 130. The pages stored in the memory of the client device 130 may include pages previously viewed by the user within a threshold time interval of a current time. In one embodiment, the pages selected from memory are pages having an ordered sequence for presentation between the currently displayed page and an additional page in the digital magazine. Therefore, if the user is navigating through the digital magazine, content items presented in an indication of modification may be retrieved from pages in the digital magazine preceding or subsequent to the currently displayed page in the sequence of pages.

In one embodiment, the content update rate determines a number of pages between the displayed page and an additional page to display and the indication of modification provides a representation of the number of pages. For example, the number of pages between the currently displayed page and the additional page may be based on the time to complete the input; as an example, if the input is completed in 2 milliseconds, more pages are between the displayed page and the additional page than if the input is completed in 20 milliseconds. As another example, the distance traversed from the portion to the additional portion indicates the number of pages between the displayed page and an additional page; hence, more pages are between the displayed page and the additional page if the traversal covers 300 pixels rather than 100 pixels. Alternatively, the content update rate determines a rate at which to present pages between the displayed page and the additional page. For example, the rate at which content items from pages between the displayed page and the additional page are presented directly corresponds to the rate at which the user traverses from the portion to the additional portion. Thus, if the content update rate, which is based in part on the rate at which the user traverses from the portion to the additional portion, exceeds a threshold, a page edge turn indication is displayed; however, if the content update rate is less than or equal to the threshold value, the page turn indication is displayed, so a subset of content items from various pages between the displayed page and the additional page are presented.

Similar to the pages selected for display by the indication of modification, the additional page may be a page selected from one or more pages stored in the memory of the client device 130. For example, the additional page from memory is a page previously viewed by the user within a threshold time interval of a current time. Alternatively, the additional page may be a blank page to indicate that there is not additional content for display.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for displaying updates to one or more content items in a digital magazine, the method comprising:
   receiving one or more content items from a digital magazine server and instructions for displaying the content items on a client device to a user of a digital magazine server;
   displaying the one or more content items presented in display regions of a display device included on the client device;
   receiving an input from the user interacting with a portion of the display device and traversing to an additional portion of the display device;
   obtaining a threshold from information associated with the user by the digital magazine server, the threshold based on previous content update rates of the user based on previous rates at which the user traversed between different portions of the display device;
   determining a content update rate based at least in part on a rate at which the user traverses from the portion of the display device to the additional portion of the display device; and
   responsive to the content update rate exceeding the threshold, displaying images representing page edge turns comprising edges of pages that do not include content.

2. The method of claim 1, further comprising:
   responsive to the content update rate being less than or equal to the threshold, displaying a subset of content items included on one or more pages of the digital magazine other than a page including the displayed one or more content items.

3. The method of claim 2, wherein the subset of content items included on one or more pages are selected from one or more pages stored in a memory of the client device.

4. The method of claim 1, further comprising displaying one or more content items from one or more additional pages of the digital magazine that are subsequent to a page in the digital magazine including modified content items after the content items being displayed are modified.

5. The method of claim 1, further comprising displaying an additional page in the digital magazine different than a page including the displayed content items after the content items being displayed are modified.

6. The method of claim 5, wherein the additional page is selected from one or more pages stored in a memory of the client device.

7. The method of claim 6, wherein the one or more pages stored in the memory of the client device include a page previously viewed by the user within a threshold time interval of a current time.

8. The method of claim 1, wherein the display device comprises one or more eye-tracking cameras.

9. The method of claim 1, wherein the display device comprises one or more proximity sensors, one or more heat sensors, one or more resistive sensors, and any combination thereof.

10. The method of claim 1, wherein the input from the user is selected from a group consisting of: a gesture, an eye movement, an interaction with a stylus, a physical contact with the display device, a contactless hover with the display device, and any combination thereof.

11. The method of claim 1, wherein the traversal from the portion to the additional portion has a measured magnitude and one or more measured directions of movement.

12. The method of claim 1, wherein the information associated with the user by the digital magazine server comprises previous content update rates of the user.

13. A method for displaying updates to one or more content items, the method comprising:
   receiving one or more content items from a digital magazine server and instructions for displaying the content items on a client device to a user of a digital magazine server;
   displaying the one or more content items presented in display regions of a display device included on the client device;
   receiving an input from the user interacting with a portion of the display device and traversing to an additional portion of the display device;
   obtaining a threshold from information associated with the user by the digital magazine server, the threshold based on previous content update rates of the user;
   determining a content update rate based at least in part on a rate at which the user traverses from the portion of the display device to the additional portion of the display device; and
   responsive to the received input, displaying an indication of modification of the content items displayed, the displayed indication comprising images representing page edges of pages that do not include content, when the content update rate exceeds the threshold.

14. The method of claim 13, further comprising:
   responsive to the content update rate being less than or equal to the threshold, displaying a subset of content items included on one or more pages of the digital magazine other than a page including the displayed one or more content items.

15. The method of claim 14, wherein the subset of content items included on one or more pages are selected from one or more pages stored in a memory of the client device.

16. The method of claim 13, further comprising displaying one or more content items from one or more additional pages of the digital magazine that are subsequent to a page in the digital magazine including modified content items after the content items being displayed are modified.

17. The method of claim 13, further comprising displaying an additional page in the digital magazine different than a page including the displayed content items after the content items being displayed are modified.

18. The method of claim 13, wherein the input from the user is selected from a group consisting of: a gesture, an eye movement, an interaction with a stylus, a physical contact with the display device, a contactless hover with the display device, and any combination thereof.

19. The method of claim 13, wherein the traversal from the portion to the additional portion has a measured magnitude and one or more measured directions of movement.

20. A computer program product comprising a non-transitory computer-readable storage medium containing instructions that, when executed by a processor, cause the processor to:
   receive one or more content items from a digital magazine server and instructions for displaying the content items on a client device to a user of a digital magazine server;
   display the one or more content items in display regions of a display device included on the client device;
   receive an input from the user interacting with a portion of the display device and traversing to an additional portion of the display device;

obtain a threshold from information associated with the user by the digital magazine server, the threshold based on previous content update rates of the user;

determine a content update rate based at least in part on a rate at which the user traverses from the portion of the display device to the additional portion of the display device; and display an indication of modification of the content items displayed, the display indication comprising images representing page edges of pages that do not include content, when the content update rate exceeds the threshold.

21. The computer program product of claim 20, wherein the non-transitory computer readable storage medium further comprises instructions that, when executed by a processor, cause the processor to:

responsive to the content update rate being less than or equal to the threshold, display a subset of content items included on one or more pages of the digital magazine other than a page including the displayed one or more content items.

22. The method of claim 21, wherein the subset of content items included on one or more pages are selected from one or more pages stored in a memory of the client device.

23. The method of claim 20, further comprising displaying one or more content items from one or more additional pages of the digital magazine that are subsequent to a page in the digital magazine including modified content items after the content items being displayed are modified.

24. The method of claim 20, further comprising displaying an additional page in the digital magazine different than a page including the displayed content items after the content items being displayed are modified.

* * * * *

UNITED STATES PATENT AND TRADEMARK OFFICE
CERTIFICATE OF CORRECTION

PATENT NO. : 9,712,575 B2
APPLICATION NO. : 14/024510
DATED : July 18, 2017
INVENTOR(S) : Ying et al.

Page 1 of 1

It is certified that error appears in the above-identified patent and that said Letters Patent is hereby corrected as shown below:

In the Claims

Column 20, Line 4, Claim 22, delete "method" and insert --computer program product--

Column 20, Line 8, Claim 23, delete "method" and insert --computer program product--

Column 20, Lines 8-9, Claim 23, delete "further comprising displaying" and insert --further comprising instructions to: display--

Column 20, Line 13, Claim 24, delete "method" and insert --computer program product--

Column 20, Lines 13-14, Claim 24, delete "further comprising displaying" and insert --further comprising instructions to: display--

Signed and Sealed this
Nineteenth Day of November, 2019

Andrei Iancu
*Director of the United States Patent and Trademark Office*